United States Patent [19]

Sullivan et al.

[11] 4,126,860

[45] Nov. 21, 1978

[54] WIRE DETECTOR

[75] Inventors: William B. Sullivan, Columbus, Ohio; James M. Tresidder, Jr., Sunnyvale; Gabor V. Molnar, Belmont, both of Calif.

[73] Assignee: GTE Sylvania Incorporated, Mountain View, Calif.

[21] Appl. No.: 14,809

[22] Filed: Feb. 6, 1970

[51] Int. Cl.² .............................................. G01S 9/02
[52] U.S. Cl. .............................. 343/5 NA; 343/5 SA
[58] Field of Search ................. 343/5 R, 5 PD, 5 SA, 343/5 NA

[56] References Cited

U.S. PATENT DOCUMENTS

| | | | |
|---|---|---|---|
| 3,119,999 | 1/1964 | Jaffe | 343/5 SA X |
| 3,311,914 | 3/1967 | Barringer | 343/5 SA X |
| 3,831,173 | 8/1974 | Lerner | 343/5 NA |
| 3,836,960 | 9/1974 | Gehman et al. | 343/5 SA X |
| 4,072,942 | 2/1978 | Alongi | 343/5 NA |

Primary Examiner—T.H. Tubbesing
Attorney, Agent, or Firm—John F. Lawler

[57] ABSTRACT

A pulser circuit produces pulses of broadband radio frequency (RF) electromagnetic wave energy that are coupled through a hybrid to a transmit-receive antenna which is contiguous with the ground. If a transmitted pulse is incident on a conductive wire in the ground, a ringing is set up in it. The wire retransmits the electromagnetic wave signal with the energy concentrated at the ringing frequency. Signals received by the antenna are coupled through the hybrid and selectively passed by a gate circuit to a processor. Signals passed by the gate are combined with a local oscillator signal in a mixer to produce an intermediate frequency (IF) signal that is displayed on an oscilloscope. A concentration of energy at a particular frequency on the oscilloscope display is an indication that a wire is in the ground below the antenna. The operation of the pulser and the gate are controlled by timing pulses from a clock circuit.

6 Claims, 10 Drawing Figures

INVENTORS
WILLIAM B. SULLIVAN
JAMES M. TRESIDDER, JR.
GABOR V. MOLNAR

BY Russell A. Cannon

INVENTORS
WILLIAM B. SULLIVAN
JAMES M. TRESIDDER, JR.
GABOR V. MOLNAR

BY *Russell A. Cannon*

WIRE DETECTOR

BACKGROUND OF INVENTION

The invention herein described was made in the course of or under a contract or a subcontract thereunder, (or grant) with the Department of the Army.

This invention relates to detectors and more particularly to apparatus for detecting the presence of conductive wires.

There are many instances where it is desirable to know the location of buried wires. When it is necessary to repair electrical wiring in an old house, for example, it is desirable to know the exact location and path of the wires in the walls and ceilings so that a minimum amount of wallboard can be broken away in making the repairs. One technique employed in locating such wires is to study the known connections thereto and then make a calculated guess as to the path of the wires between these connections. It is also desirable to be able to check out an area in which wires are believed to be buried before excavations are started there. Although mine (metal) detectors are sometimes employed to locate buried wires, they are not particularly satisfactory since a relatively large metal object must be present to obtain a good indication of the presence thereof. Although a metal detector may also be employed to detect wires in the walls of a building, it will provide similar indications for wires, metal pipes and large nails.

An object of this invention is the provision of an improved apparatus for detecting the presence of electrically conductive wires.

SUMMARY OF INVENTION

In accordance with this invention, a pulse of broadband RF electromagnetic wave energy is transmitted into a medium which may contain a conductive wire. If the pulse is incident on a wire having a relatively large length to diameter ratio, a ringing is set up in the wire. The electromagnetic wave signal is retransmitted by the wire with the energy concentrated at the ringing frequency. Received signals from the medium are processed to determine whether they contain a ringing frequency signal which indicates that a wire is present in the medium.

DESCRIPTION OF PREFERRED EMBODIMENTS

Figure 1:
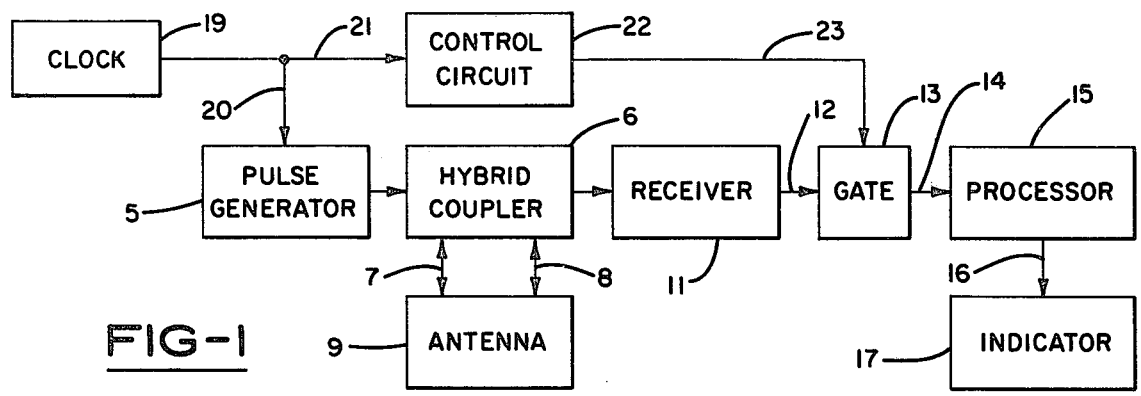
FIG. 1 is a block diagram of a system embodying this invention.

Referring now to FIG. 1, generator 5 produces a pulse signal that is coupled through hybrid 6 and applied on lines 7 and 8 to a transmit-receive antenna 9. Signals received by the antenna are applied on lines 7 and 8 to the hybrid and are serially coupled through receiver 11, gate 13 and processor 15 to an indicator device 17. A clock 19 which controls the operation of the system produces timing pulses that are applied on line 20 to generator 5. The timing pulses are also applied on line 21 to a circuit 22 which controls the opening and closing of gate 13.

Figure 2:
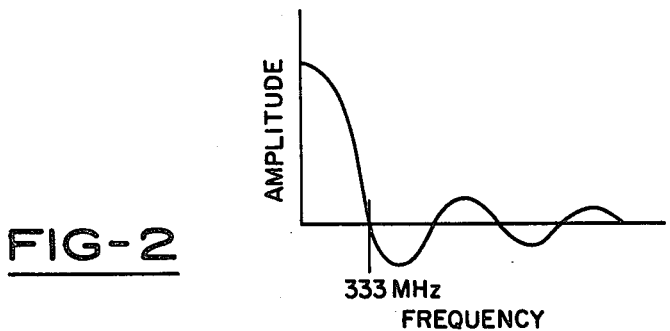
FIG. 2 is a curve illustrating the spectral composition of the output of the pulse generator in FIG. 1.

Generator 5 produces pulses of radio frequency electromagnetic wave energy of short duration, e.g., 3 nanoseconds. The maximum length of the pulse is determined empirically and is related to the size and length of wires to be detected. In order to detect wires of different lengths, wires must be illuminated with RF energy of a frequency commensurate with the wire length. More particularly, the wire must be an even multiple of a quarter-wave length long for the frequency of some component of the pulse. By way of example, to detect a wire four feet long the pulse preferably comprises a spectral component having a frequency of 128 MHz. Thus, generator 5 must be a wideband radio frequency source producing a broadband RF pulse signal. In a system that was successfully built and tested, the pulse had a Fourier spectrum represented by the curve in FIG. 2 and comprised spectral components having frequencies through 333 MHz.

Figure 3:
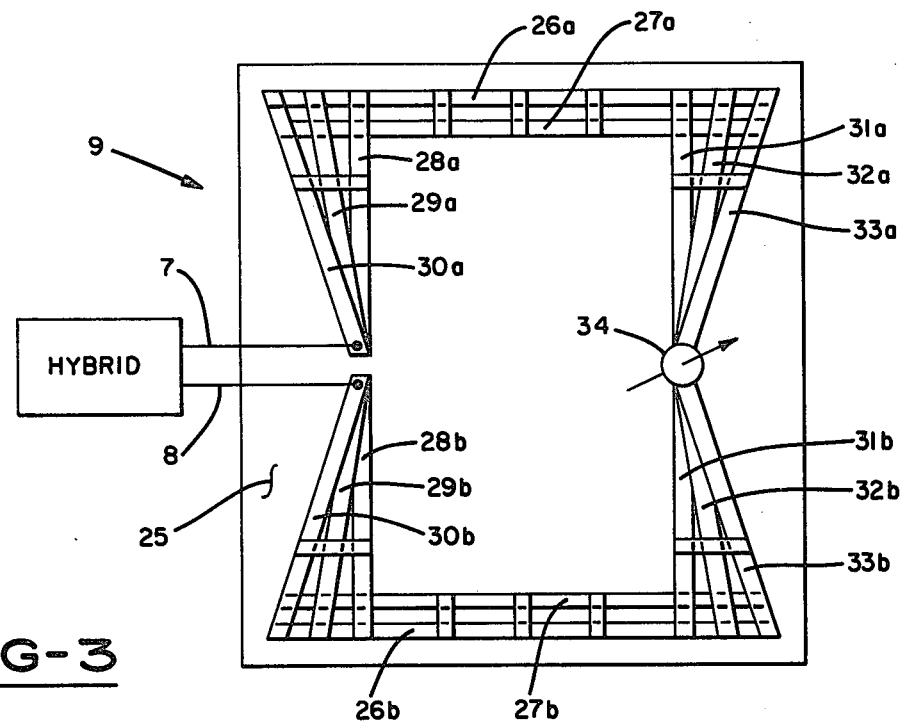
FIG. 3 is a detailed plan view of the antenna in FIG. 1.

Antenna 9 may, by way of example, be a rectangular transmission line antenna formed on a planar dielectric base 25, see FIG. 3. In a system that was successfully built and tested, the base 25 was a rectangular planar dielectric sheet of mylar 1/16 inch thick and measuring 21.5 inches by 24.5 inches. The antenna pattern was formed on the base with adhesive backed copper strips $\frac{3}{8}$ inch wide and 4 mil thick which defined an essentially rectangular and symmetrical pattern having overall dimensions of approximately 21 inches by 24 inches. The strips 26 and 27 were spaced approximately $\frac{1}{2}$ inch apart. The strips 28, 29 and 30 and also the strips 31, 32 and 33 were spaced approximately 0.625 inch apart at their connections to strips 26. The strips 28a-30a and 28b-30b were also spaced approximately 0.378 inch apart at the connections thereof to lines 7 and 8, respectively. The strips 31a-33a and 31b-33b are electrically connected at their midpoints through a variable resistor 34. All of the conductive strips were electrically connected by silver soldering at the crossover points thereof. The 500 ohm variable resistor 34 is employed to balance the antenna when it is in contact with a medium that does not contain a conductive wire in order to minimize reflections from and ringing in the antenna itself and thus reduce noise signals applied to the processor.

Figures 4, 9:
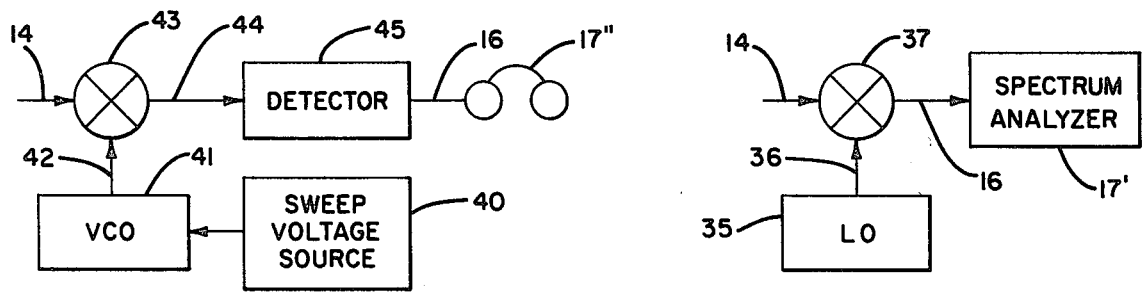
FIG. 4 is a block diagram of the processor and indicator in FIG. 1.
FIGS. 9 and 10 are schematic block diagrams of alternate embodiments of the processor and indicator in FIG. 1.
Figure 10:
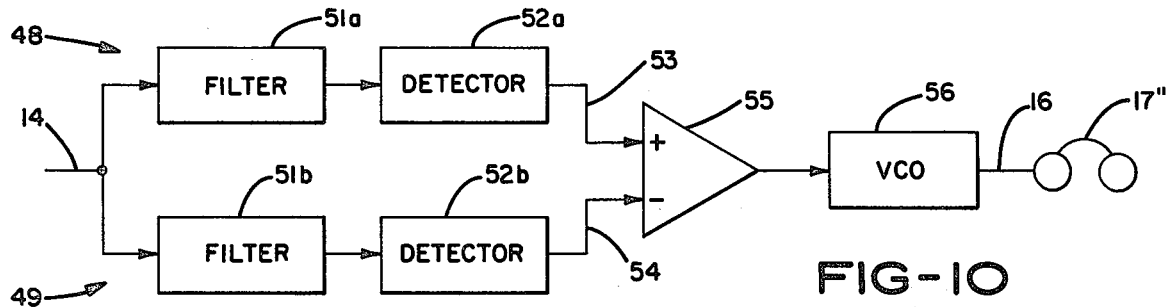

Referring now to FIG. 4, the processor may, by way of example, comprise a source 35 producing a constant frequency local oscillator signal on line 36 which is combined in mixer 37 with the signals passed by gate 13. The intermediate frequency signal produced on line 16 by the mixer is applied to an analyzer 17'.

During quiescent operation prior to receipt of a timing pulse on line 21, the control circuit maintains gate 13 closed. In response to a timing pulse from the clock, generator 5 produces an RF pulse which is transmitted into the ground by the antenna. Since there may be some direct reflection from the surface of the ground and ringing in the antenna, circuit 22 maintains gate 13 closed for a prescribed time interval (which is determined empirically) after receipt of the timing pulse.

Figure 5:
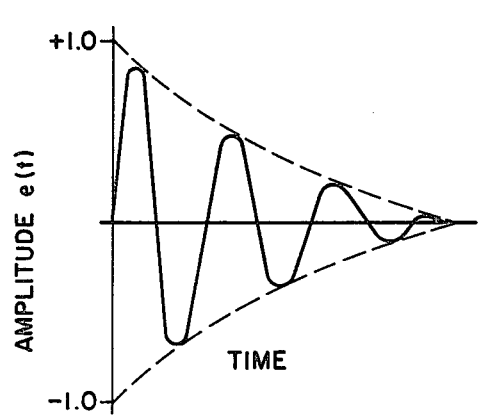
FIG. 5 is a waveform representing an exponentially decaying pulse of radio frequency energy.
Figure 6:
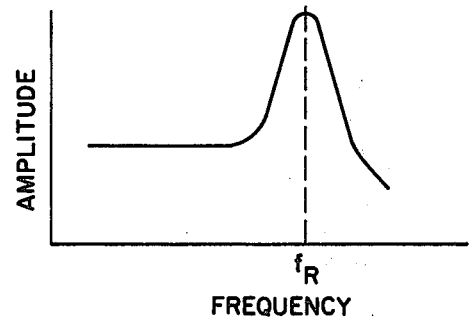
FIG. 6 is a curve representing the frequency transform of the waveform in FIG. 5.

If a wire is in the ground under the antenna, the pulse is received by the wire and transmitted to the end thereof where it is reflected and sets up a ringing on the wire. The signal is retransmitted by the wire as an exponentially decaying pulse, see FIG. 5, having the energy therein concentrated at a rining frequency which is related to the length of the wire. The frequency transform of the exponentially decaying pulse and the associated ringing frquency $f_R$ are illustrated in FIG. 6.

Figure 8:
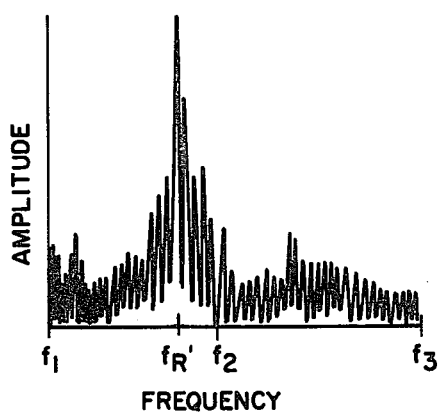
FIG. 8 is a curve that is representative of the display on the cathode ray tube in FIG. 4 when a wire is detected.
Figure 7:
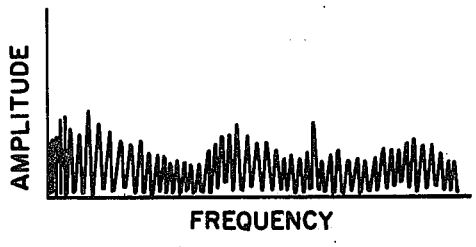
FIG. 7 is a curve that is representative of the display on the cathode ray tube in FIG. 4 when a wire is not detected.

The pulse signal from the wire is received by the antenna, amplified in the receiver and applied on line 12 to the gate. After the short prescribed time delay for the direct reflections from the surface of the ground and ringing in the antenna in response to the pulse from generator 5 to decay to a nominal value, circuit 22 produces a signal of one polarity on line 23 which opens the gate. The received signal is mixed with the fixed frequency local oscillator signal to produce a video pulse signal on line 16 that is applied to the analyzer to produce a display of the spectral components comprising the received signal. The curve in FIG. 7 illustrates the spectral composition of signals received by the antenna when a wire is not present in the ground under the antenna. In contrast, the curve in FIG. 8 illustrates the spectral composition of a signal received by the antenna when a length of wire is located in the ground under the antenna. The strong concentration of energy about the frequency $f_R'$ is an indication that there is a wire in the ground under the antenna. The control circuit reverses the polarity of the output thereof to close the gate prior to generation of the next timing pulse.

In a modified form of this invention, the processor 15 comprises a source 40, voltage controlled oscillator (VCO) 41, mixer 43 and detector 45, see FIG. 9. The VCO is responsive to the sweep voltage from source 40 for producing a signal on line 42 having a frequency that varies over a band of frequencies at a rate determined by the sweep voltage. The variable frequency local oscillator signal and the received signal passed by the gate are combined in the mixer to produce an IF signal on line 44 that is detected and applied to a pair of earphones 17". In operation, a human operator listens to the intensity of the audio signal in the earphones, a significant charge therein indicating that a wire is located in the ground under the antenna.

In another embodiment of this invention the processor 15 comprises a pair of channels 48 and 49 each comprising a filter 51 and detector 52; a differential amplifier 55; and a voltage controlled oscillator 56. In this system, generator 5 may be a free running pulser circuit and the gate circuit 13, clock 19 and control circuit 22 may be omitted. Filters 51a and 51b are preferably bandpass filter amplifiers which divide the spectral components comprising the pulse from receiver 11 into two sections. By way of example, filter 51a may pass signals having frequencies between $f_1$ and $f_2$ in FIG. 8 with only a small amount of attenuation whereas filter 51b provides only a small amount of attenuation to signals having frequencies between $f_2$ and $f_3$. Detectors 52 produce voltages which are proportional to the energy in the signals passed by the filters. The gains of the filter amplifiers are adjusted to make the output voltages of the detectors of equal magnitude, i.e., to make the output of the differential amplifier 55 zero or a nominal value, when the system is operating and the antenna is over ground not containing a wire.

In operation, signals received by the antenna are divided equally and applied to the filters. The spectral components having frequencies within the passbands of the associated filters are passed thereby and detected. The voltages on lines 53 and 54 are combined in the comparator to produce a voltage that controls the frequency of the output of oscillator 56 which is applied to earphones 17". A human operator listening to the audio signal produced in the earphones will hear an abrupt change in the pitch or frequency of this signal when the antenna is located over a wire.

What is claimed is:

1. Apparatus for detecting a wire in a medium, comprising
   means for producing a pulse of broadband radio frequency electromagnetic wave energy,
   means for transmitting said pulse into the medium,
   means for receiving electromagnetic wave signals from said medium,
   means for detecting a concentration of energy in received signals at a ringing frequency comprising
      an oscilltor producing a local oscillator signal,
      a mixer combining received signals and a local oscillator signal for producing an intermediate frequency signal,
      an indicator, and
      means for coupling the intermediate frequency signal to said indicator, and
   a source of sweep voltage,
      said oscillator being a voltage controlled oscillator responsive to the sweep voltage for producing a local oscillator signal having a frequency that is swept across a band of frequencies.

2. Apparatus according to claim 1 wherein said indicator comprises an electro-acoustic transducer and wherein said coupling means comprises a detector producing an output voltage that is applied to said transducer.

3. Apparatus for detecting a wire in a medium, comprising
   means for producing a pulse of broadband radio frequency electromagnetic wave energy,
   means for transmitting said pulse into the medium,
   means for receiving electromagnetic wave signals from said medium, and
   means for detecting a concentration of energy in received signals at a ringing frequency comprising
      a first filter passing received signals having spectral components within a first part of the frequency bandwidth of said radio frequency pulse,
      a first detector responsive to the first filter output signal for providing a voltage proportional to the energy therein,
      a second filter passing received signals having spectral components within a second part of the frequency bandwidth of said radio frequency pulse which is different from said first part,
      a second detector responsive to the second filter output signal for producing a voltage proportional to the energy therein,
      means for differentially combining the output signals of said detectors,
      an acousto-electric transducer, and
      means for coupling the output voltage of said differential combining means to said transducer.

4. Apparatus according to claim 3 wherein said coupling means comprises a voltage controlled oscillator.

5. Apparatus for detecting a wire in a medium, comprising
   means for producing a pulse of broadband radio frequency electromagnetic wave energy,
   means for transmitting said pulse into the medium,
   means for receiving electromagnetic wave signals from said medium, and
   means for detecting a concentration of energy in received signals at a ringing frequency comprising
   an oscillator producing a local oscillator signal,
   a mixer combining received signals and the local oscillator signal for producing an intermediate frequency signal,
   an indicator, and
   means for coupling the intermediate frequency signal to said indicator,
   said pulse producing means comprising
   a clock circuit producing timing pulses, and
   a pulser circuit responsive to the timing pulses for producing a radio frequency pulse signal,
   said detecting means further comprising
   a control circuit, and
   a gate circuit having a first input receiving signals from said receiving means and having a second input receiving signals from said control circuit and having an output connected to said mixer, said control circuit being responsive to timing pulses from said clock for producing a control signal for opening said gate a prescribed time interval after generation of a radio frequency pulse.

6. Apparatus according to claim 5 wherein said transmitting and receiving means each comprise the same antenna and hybrid circuits.

* * * * *